United States Patent Office 3,298,942
Patented Jan. 17, 1967

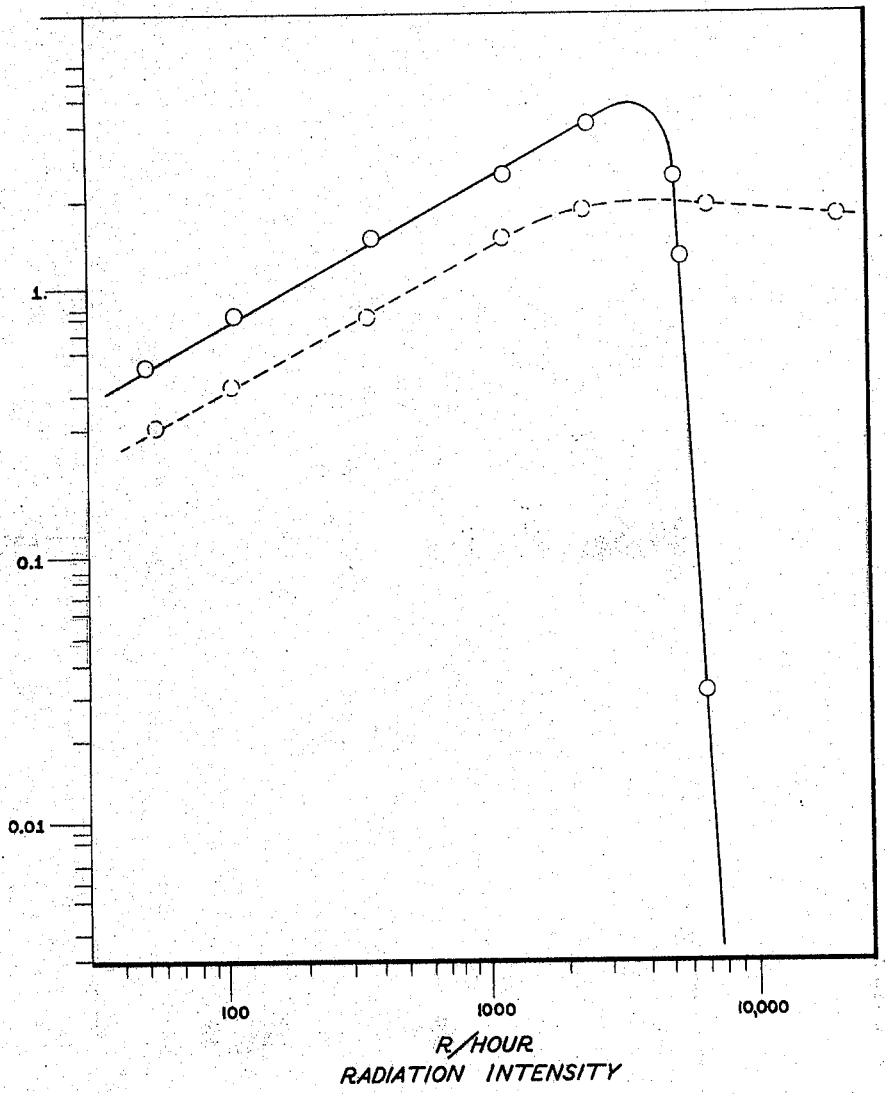

3,298,942
PRODUCTION OF GRAFT COPOLYMERS OF PERHALOGENATED OLEFINS
Michel Magat and Adolphe Chapiro, Paris, France, assignors to Centre National de la Recherche Scientifique Ministere de l'Education Nationale, Paris, France
Filed May 20, 1958, Ser. No. 736,614
Claims priority, application France, Oct. 26, 1957, 750,274; Jan. 31, 1958, 757,183; Feb. 12, 1958, 758,081
21 Claims. (Cl. 204—159.17)

This invention relates to new and useful improvements in the production of graft copolymers from inert trunk polymers.

In our copending application Serial No. 553,157, filed December 14, 1955, and now Patent No. 3,252,880, a process is described for the production of graft copolymers, using ionizing radiation.

In accordance with one embodiment of this application, the polymer on which the graft is to be formed, is exposed to high energy ionizing radiation while in single phase contact with the monomer, i.e., the monomer and polymer are subjected to mutual radiation while in solution (with or without solvent) or with the polymer swollen with the monomer. Oxygen which acts as polymerization inhibitor is preferably excluded during the radiation, and the grafting proceeds during the radiation.

The starting monomer is preferably a vinyl or divinyl monomer which is polymerizable in the presence of free radicals.

The graft copolymer formed is one having a backbone or trunk of the starting polymer, with a number of side chains or branches of the polymer of the starting monomer. The graft copolymer generally possesses properties which are appreciably different from those of ordinary copolymers, constituted by the same component monomer unit, but distributed at random in a straight or branched chain. Ordinarily, typical copolymers have properties intermediate between those of the two homopolymers, while the graft copolymer may possess some properties of each of the component polymers. In this respect, the graft copolymers represent a class of compounds having properties different from those of ordinary plastic materials.

The high energy ionizing radiation used has a much shorter wave length than ultra violet light and is, for example, in the form of β-rays, γ-rays, neutrons, accelerated electrons, heavy particles, X-rays, or the like. Convenient sources of such radiation may be furnished by atomic piles, electron or particle accelerators, radio active isotopes, X-ray equipment, and the like.

The starting polymer which forms the trunk of the graft copolymer may be any polymer capable of producing free radicals under ionizing radiation.

The starting polymer may be dissolved in the monomer when in the same is soluble therein, or may be swollen by the monomer. The grafting may be effected on a preformed polymer trunk throughout its mass or to any desired depth and takes place without modifying the geometric shape thereof.

When using highly inert starting polymers, as for example, those which do not contain hydrogen atoms such as polytetrafluoroethylene or polychlorotrifluoroethylene, the monomer does not penetrate into the polymer mass and it is only possible to, at best, obtain an inter-surface grafting, i.e., a two-phase grafting limited to an attachment of the polymerized monomer to the surface of the starting polymer.

In this latter mentioned two-phase grafting, as for example, the grafting of vinyl monomers on polytetrafluoroethylene films, the weight of the film after grafting, does not increase by more than a few percent.

One object of this invention, is the grafting of vinyl monomers, uniformly throughout a given mass of an inert polymer, such as polytetrafluoroethylene or polychlorotrifluoroethylene, using ionizing radiation. This, and still further objects will become apparent from the following description:

In accordance with the invention, it has been found that a monomer which does not normally penetrate a particular polymer under the above described grafting conditions, may be grafted onto this polymer to form a graft copolymer to any desired depth, or uniformly throughout the mass of the polymer, if the radiation is at least partially effected with a low intensity, producing a polymerization rate below the rate of penetration of the monomer, through the graft copolymer formed.

When irradiating such a polymer in contact with such a monomer, with this low intensity radiation, while the monomer cannot penetrate or swell the polymer, it will form a graft copolymer at the surface of the polymer in the conventional manner. The monomer can then penetrate the graft copolymer, whereas the same could not penetrate the initial starting polymer. Since the radiation is effected at such an intensity that the polymerization rate is below the rate of penetration of the monomer through the graft copolymer, the monomer penetrates through the graft copolymer, without being consumed by graft polymerization, and homopolymerization reactions, and thus grafts onto the initial polymer at the interphase where the initial graft polymerization has terminated. In this manner, the monomer can progressively penetrate further into the polymer, grafting as the same goes along, so that graft polymerization may be effected to any desired depth, or uniformly throughout the mass of the initial polymer. The effect is therefore more or less a "boot strap" operation, with the monomer continuously making a penetratable layer for itself, by graft polymerization, and with the radiation level being low enough, so that the monomer is not consumed in the polymerization reaction before it can penetrate.

Typical in depth grafted products obtainable in accordance with the invention are, for example, hydrogen-free polymers, such as polytetrafluoroethylene and polychlorotrifluoroethylene grafted with acrylates and methylmethacrylates, vinyl acetate or chloride, acrylonitrile, vinyl pyrrolidone, acrylamide, styrene, vinyl toluene, butadiene, isoprene, chloroprene and mixtures thereof and other well known free radical polymerizable monomers.

If the radiation intensity is high enough to produce a grafting rate above the rate of penetration, the monomer will be consumed by the polymerization reaction as it penetrates into the surface of the polymer, so that grafting will be limited to the surface zone.

The exact maximum intensity of radiation at which the polymerization rate will still be below the rate of penetration or diffusion of the monomer through the graft copolymer formed, will vary depending upon the starting materials and the conditions of the graft polymerization. Thus, for example, the limit of the maximum radiation intensity permissible will vary with the starting monomer and polymer, the temperature at which the graft polymerization is effected, the thickness of the polymer, its effective surface area, presence or absence of a solvent, and the like, but may be very easily empirically determined.

The accompanying drawing is a graph showing the effect of the radiation intensity on the degree of grafting. The rate of grafting is indicated by the value $$(Wt-Wt_0)/Wt_0$$

per hour, $Wt$ being the dry weight of the graft copolymer formed at the particular time of measurement and $Wt_0$ being the initial weight of the starting base polymer. The value $(Wt-Wt_0)/Wt_0$ per hour, therefore merely indicates the weight increase of the graft copolymer formed divided by the initial weight of the starting base polymer per hour. The radiation intensity is given in the conventional units of roentgens per hour (r./hour). The particular curve shown in solid line is for the grafting of styrene on a polytetrafluoroethylene (Teflon) film of 0.1 mm. thickness at a temperature of about 19° C. As may be seen at a radiation intensity of about 7000 roentgens per hour, the polymerization rate of the styrene in forming the graft copolymer and the polystyrene homopolymer will just equal or slightly exceed the rate of penetration of the styrene through the polystyrene-Teflon graft copolymer formed. All of the styrene monomer will therefore be used up in the polymerization so that the degree of grafting will be very small. As the radiation intensity is, however, reduced slightly below this value, the polymerization rate decreases below the rate of penetration of the styrene monomer through the graft copolymer formed so that the degree of grafting is at its maximum value. As the radiation intensity is further decreased, the degree of grafting correspondingly decreases as is shown in the graph and as would normally be expected with the decrease in the polymerization rate accompanying the decrease in radiation intensity.

The value of the radiation intensity, under any given grafting conditions, at which the polymerization rate is just below the rate of penetration of the monomer through the graft copolymer formed, therefore constitutes the critical intensity for that particular polymer monomer combination. At this critical intensity the degree of grafting will be at its maximum. Below this intensity the degree of grafting will proportionately decrease and above this intensity the degree of grafting will sharply drop and grafting will be limited to the surface.

It is thus seen that whereas for normal radiation grafting conditions the rate of grafting steadily increases with radiation intensity, an entirely different and unsuspected result is obtained under the grafting conditions of the present invention in that a critical intensity exists above which homogenous grafting in depth no longer occurs. On the other hand, operating within the area of critical intensity gives maximum grafting results.

The polymerization rate for the monomer and/or the rate of diffusion of the monomer through the graft copolymer formed not only depend on the particular monomer-polymer combination and the particular conditions of the graft polymerization, but may also be controlled by the presence of a solvent. Thus, for example, a solvent may be used to decrease the polymerization rate of the monomer and/or to increase the diffusion rate of the monomer through the graft copolymer formed, thus raising the value of the critical intensity and allowing the use of radiation intensities higher than those which would normally be permissible without the presence of the solvent.

Therefore when reference is made herein and in the claims to the fact that the radiation intensity produces a polymerization rate below the rate of penetration of the monomer through the graft copolymer formed, the "polymerization rate" and the "rate of penetration of the monomer" refer to these rates in connection with the particular graft polymerization system, due consideration being given to the presence or absence of a solvent.

As the solvent, any solvent which will decrease the rate of polymerization of the monomer and/or increase the rate of penetration of the monomer through the graft copolymer may be used.

Generally, the solvent useful for influencing the radiation action in the progressive grafting in accordance with the invention is any in which the particular monomer is at least limitedly soluble as, for instance, in the order of magnitude of at least about 1–3% by weight, but is substantially inert (nonswelling) with respect to the polymer to be grafted and which acts as a diluent for the monomer with which the graft polymerization is to be carried out. Suitable solvents are water and aqueous media, hydrocarbons, amines, alcohols, esters, ethers, ketones, etc.

Where the starting monomers have a very low rate of penetration through the graft copolymer formed, i.e., where the graft copolymer is relatively insoluble in the starting monomer, solvents which increase the solubility of the graft copolymer, as for example, by having groups with a polarity corresponding to the polarity of the graft copolymer and groups with a polarity corresponding to that of the monomer, should be used. In this connection, for example, highly polar solvents, such as formamide, dimethyl formamide, nitriles or the like may be desirable.

The preferred solvent is one which decreases the rate of homopolymerization by ionizing (high energy) radiation of the monomer used, thereby favoring diffusion with respect to polymerization grafting. Typical of such solvents are those containing aromatic neclei and particularly solvents of the type of aromatic hydrocarbons, alcohols, esters, ethers, ketones, amines, etc.

By way of exemplification of a monomer solvent combination there may be mentioned methyl methacrylate in methylacetate, benzene or toluene; acrylonitrile in dimethyl formamide; styrene in toluene or benzene; butadiene in benzene, and vinyl pyrrolidone in water.

There is no critical limitation as to the concentration of monomer in solutions except that very low monomer content may become impractical as to time consuming in the weight rate of grafting obtained.

The dotted line curve in the drawing shows the effect of the use of a solvent and the relationship of the degree of grafting to the radiation intensity. The curve represents the grafting of styrene on a polytetrafluoroethylene film at 19° C., in the identical manner mentioned in connection with the solid line curve, except that the styrene is dissolved as a 50% by volume solution in benzene. As may be noted, the radiation intensity may be increased to a value above the critical intensity established for operation without the presence of a solvent (solid curve) and a high degree of grafting will still be obtained.

The limits of the "critical radiation" intensity may be determined, for example, by carrying out tests under the particular reaction conditions, and reducing the radiation intensity until a graft is obtained to the desired depth.

The critical intensity may be relatively sharply defined, as illustrated by the solid curve or may extend over a considerable area of slope as indicated by the dotted curve.

Curves showing critical intensities and the range of operability with respect to intensity at which grafting to any predetermined depth still occurs, may be plotted for any given polymer-monomer systems subjected to radiation in accordance with the invention by the following procedure: Polymer A in contact with monomer B (with or without solvent is subjected to a radiation at various intensities. At each intensity the weight increase of Polymer A by grafting is measured for various radiation times. This permits the determination of the rate of grafting as expressed in weight increase per unit time (hr.). The rates of grafting obtained for various intensities are then plotted as a function of radiation intensities. A convenient method of plotting these data is by way of a logarithmic scale as used in the above discussed graphs.

The total radiation doses necessary to obtain extensive grafting rates are generally relatively small, varying, for example, between about 10,000 and 5,000,000 roentgen units.

After the monomer has penetrated to the desired depth under the low radiation intensity, the intensity may be increased even above the critical intensity so that the grafting rate is substantially increased and grafting will still be effected to this initial depth at which the radiation was increased. Thus, for example, the radiation with the initial low intensity may be effected until the graft copolymerization is effected throughout the entire mass of the support polymer. The grafted copolymers swollen by the monomer may then be subjected to higher intensity radiation, thus allowing the grafting to be more rapidly completed.

In order to effect this mode of operation, the polymer may be contacted with the monomer, with the source of radiation at a predetermined distance therefrom. The source of radiation may then be gradually brought closer to the polymer, or the polymer closer to the source. Under these conditions, the radiation starts at a very low intensity and continues at progressively increasing intensities, reaching the highest intensity at th econclusion of the process, where the base polymer is most closely positioned to the source of irradiation, and thus subjected to the higher intensities.

It is also possible in accordance with the invention to effect the radiation with a radiation intensity above the critical intensity and to periodically reduce the intensity below the critical intensity or to interrupt the radiation.

Thus, the graft polymerization system may be subjected to a radiation intensity above the critical value for a short period of time and then the radiation may be interrupted for a period of time sufficient to allow penetration of the monomer into the partially or superficially grafted polymer and then again subject the system to the higher radiation intensity, continuously repeating these steps during the grafting operation. Under these conditions the penetration of the monomer into the partially grafted polymer is favored during the period of interruption or low intensity radiation and it is possible to operate at much higher intensities of radiation than would be possible if the system were continuously subjected to radiation at a given level. The optimum times of the radiation and the interruption of the radiation may be determined empirically for each individual case. The successive radiations and interruption times may be equal or unequal, may increase or decrease, depending on the particular circumstances.

The first radiation must, however, be sufficiently long to start the grafting at the surface of the polymer. During the first interruption the monomer must have time to penetrate through this grafted layer. The following radiation times must be determined in such a manner as to be sufficiently long to graft the monomer which is penetrated into the previous layer, and conversely the interruptions must be of sufficient length to allow penetration of the monomer through the graft copolymer previously formed.

If the radiation is not interrupted but its level merely reduced, the maximum intensity permissible during the reduced period must produce a polymerization rate below the rate of penetration of the monomer through the graft copolymer previously formed during the period of high radiation intensity and through the graft copolymer being formed during the lower intensity radiation.

The operation may be effected continuously by moving the polymer system past a source of radiation in accordance with a well defined cycle.

The graft polymerization, in accordance with the invention, is generally effected in a very viscous polymer medium so that the growth of the graft polymer chains can continue for a relatively long period of time after interruption of the radiation. With the use of the intermittent radiation, therefore, the grafted chains may continue to grow during the interruptions, and a much greater quantity of monomer may be grafted to the original polymer for a given radiation dose. This has the surprising effect, as is further illustrated in the examples given below, that the rate of grafting at a high intensity and for a given total period of time is greater if the radiation is interrupted than if the radiation were effected continuously.

When proceeding in accordance with the invention, it may be of advantage to increase the rate of monomer penetration by the application of heat. This is especially advantageous in the intermittent radiation technique particularly in those cases in which radiation at low temperatures is desired, since it is possible to limit the temperature increase to the non-radiation interval thus avoiding an undesirable increase in rate of radiation polymerization as the result of the increased temperature. A preferred cycle in this case is subjecting to radiation the partially grafted polymer swollen with monomer at the desired low temperature in the substantial absence of excess monomer, the radiation dose being sufficient to graft and polymerize the monomer present, and thereafter immersing the polymer in a monomer bath at a temperature of, for example, about 40–80° C., which would lead to fast swelling with additional monomer and repeating the cycle.

When operating in accordance with the invention, it is possible to effect the grafting at relatively high grafting rates, and to obtain a graft copolymer, having a weight several times greater than that of the initial starting base polymer. The grafting, in accordance with the invention, may be effected uniformly throughout the mass of a preformed base polymer, increasing the three dimensional size of the polymer, without modifying its geometric shape or external contour.

While the initial polymer may increase many times its weight and size without a modification of geometric shape upon the formation of the graft copolymer, there is generally a maximum size increase which should not be exceeded. When, for example, the size and/or weight increase beyond this value the graft copolymer may disintegrate or partially disintegrate, particularly after washing out the homopolymer simultaneously formed during the graft polymerization. Thus, for instance, when grafting styrene on polytetrafluoroethylene, such disintegration may be noted after a ten-fold weight increase.

The starting polymer base materials which form the trunk of the graft polymers, may be any polymers capable of producing under ionizing radiation, free radicals, and which are substantially incapable of being penetrated or swollen by the particular monomer used to form the graft. In this connection, there particularly enter into consideration the highly inert polymers which do not contain hydrogen atoms and especially polyolefins of this type. Particularly suitable are polyhalogeneolefins of which polytetrafluoroethylene and polychlorotrifluoroethylene are representative.

The starting monomer may be any polymerizable compound which is capable of being polymerized by free radicals as produced by conventional initiators. The term monomer is used in its broadest sense and indicates a starting material which may be polymerized and includes materials which are not necessarily monomeric molecular units in the true sense of the word, but which are starting materials for polymerization, capable of being polymerized by free radicals.

The starting monomer is preferably one which does not have too rapid a homopolymerization rate under the influence of the ionizing radiation, as compared to its rate of penetration through the graft copolymer formed, as in such instances the critical radiation intensity may be too low for practical purposes. If it is desired to effect grafting with such monomers, the use of a solvent, such as benzene, which decreases the polymerization rate, is advisable.

Once grafting has been accomplished, however, to a certain depth, the rate of homopolymerization is less critical so that it may be possible to continue the reaction with pure monomer.

Except for controlling the intensity of the radiation in order to allow the penetration of the monomer through the graft copolymer formed, the graft polymerization may be effected in identical manner as described in copending application Ser. No. 553,157. Thus the starting polymer base material which forms the trunk of the graft polymer may be irradiated with the high energy ionization radiation while in contact with the monomer, the monomer preferably being in liquid form as, for example, in solution where the monomer is not normally liquid. The trunk polymer may, for example, be in the form of finished or semifinished objects such as rods or bars, tubes, plates, films or solid or hollow bodies, or may be in the form of grains or granulars or powder, such as molding powder, or may be in the form of molded objects, fibers, etc.

The temperature at which the grafting is effected is not critical and generally the polymerization rate increases with increasing temperatures so that the critical intensity for any graft polymerization system will depend upon the temperature of that system. The temperature, of course, should be below the destruction temperature of any of the components of the system and the optimum temperature in each case may be very easily empirically determined. Generally the best results are obtained by effecting the grafting in the absence of oxygen, as for example, under vacuum.

The polymers obtained in accordance with the invention, have a number of interesting properties. Thus, for example, films of polytetrafluoroethylene grafted with styrene, show good adherence when they are applied to a polystyrene plate with a hot iron. Films which are grafted throughout their mass, soften without flowing above the softening point of the polystyrene. This property can be advantageously utilized in vacuum molding.

If the polystyrene grafted, for example, on the polytetrafluoroethylene is sulfonated, a semipermeable ion exchange diaphragm is formed in the conventional manner. This diaphragm, however, has the polytetrafluoroethylene skeleton, which is particularly inert and resistant to all chemical agents.

As will be seen from the foregoing, one important advantage of the invention is the obtaining of an entirely new class of useful products comprising graft copolymers of polymers which could not be hitherto grafted in depth. These new products, for example, retain some of the valuable properties, such as chemical inertness and/or strength and/or solubilities and the like of the trunk polymer while eliminating some of the more undesirable properties such as lack of ductility or moldability or the like of the trunk polymer. Thus, for instance, the graft copolymers obtained (in depth) with the below examples, possess the chemical inertness, strength and electric insulating properties of their trunk polymer while at the same time being moldable under the influence of heat, which is not the case for the trunk polymers per se. A typical example is, for instance, a polystyrene on "Teflon" grafted copolymer film obtained in a manner similar to Example 3 containing about 58% by weight of polystyrene, which possesses the insolubility of "Teflon" in solvents such as cyclohexane, 40% formaldehyde, 90% ethylalcohol, methylalcohol, acetic acid, formic acid, dimethylformamide, mineral white oil, lubricating oil fractions, gasoline fractions, concentrated sulfuric acid, hydrochloric acid, 20% nitric acid, caustic soda (concentrated about 30%) and NH$_4$OH, while still being swellable by swelling agents such as acetone, methylethylketone, methyl and ethylacetate, ether methylchloride, trichloroethylene and benzene, the solvent actions established by 30 days solvent contact at room temperature.

While "Teflon" does not soften or melt until about 400–450° C., the grafted product begins to soften at 110° C. showing rubbery consistency at about 150° C. and at that temperature and higher may be molded into desired shapes as, for instance, in the form of sheets or films by vacuum molding or process molding. In this manner, the moldability of the grafted copolymer permits the obtaining of many molded articles as, for instance, industrial containers which possess many of the characteristics of solvent inertness of "Teflon." Since the 58% polystyrene grafted "Teflon" product possesses Teflon's desired high dielectric properties, the same may be used also for insulation and similar purposes being readily moldable into suitable shape or form or around electrical conductors. A film about 0.12 mm. thick will, for example, have sufficient dielectric strength to withstand 15,000 v. at 10 ma.

Alternatively, a partially grafted product may be utilized with advantage. This is, for instance, illustrated in Example 2 in which a "Teflon" film was partially grafted with styrene. The copolymer surface, because of its low softening point, could be sufficiently heat softened to permit its "cementing" by pressure to another surface, in that case a polystyrene plate. In this manner, the original styrene surface was "enobled" by plating it with the grafted "Teflon." Instead of polystyrene, other surfaces to be given improved qualities may be thus used, such as wood, metal, stone, glass, etc. Useful applications include the application of corrosion and wear-resisting films of, for instance, grafted "Teflon" on wood and metals for a variety of purposes.

The modification of the grafted copolymer with respect to its being swellable by certain solvents is important in that it permits the use or application of materials containing such solvents for a variety of purposes, such as printing, dyeing, cementition. Thus the above described grafted copolymer of 58% polystyrene on "Teflon" may be printed upon or dyed with a printing ink or dye solution having as its solvent base one or more of the above enumerated solvents having a swelling action therefor. This graft copolymer may be also bonded onto other materials by using a cementitious compound of conventional composition, but having a solvent base with a swelling action therefor.

The following examples are given by way of illustration and not limitation. In the examples, irradiation is effected with a source of 18 curies of cobalt-60. The intensity of the γ-rays was measured with a ferrous sulfate dosimeter, taking as radiochemical efficiency, the oxidation value $$G_{Fe^{3+}} = 15.5$$

Irradiation in all examples is effected at temperatures of 19° C. Examples 1, 10, 11, 14, 18, 22, 25 and 27 show operation outside the limits of critical intensities.

*Example 1*

A polytetrafluoroethylene (Teflon) film of a thickness of 1 mm. was introduced into a Pyrex tube and sealed under vacuum with 6 cc. of styrene. The tube was irradiated with γ-rays at an intensity of 2160 roentgens/hour up to a total dose of 194,000 r.

The tube was then opened and the Teflon film removed, washed 3 times with benzene and examined. Its surface had become very rough and showed small rather uniformly distributed rough points. The increase in weight of the film was very small, namely about 4%.

*Example 2*

A polytetrafluoroethylene film of a thickness of 0.1 mm. measuring 5.5 x 6.0 cm. was wound on itself and sealed under vacuum in a Pyrex tube with 7 cc. of styrene so that the film extended into the monomer for a height of about 3 cm., the upper part of the film not being wetted by the monomer. The tube was then irradiated with γ-rays at an intensity of 1120 r. per hour up to a dose of 110,000 r. After this treatment, the zone of the film which had been soaked in the monomer was clearly distinguished from the zone which had not been wetted, for it was whiter, more rigid and had increased substantially in surface; its width had increased from 5.5 to 6.5 cm. A strip of a width of 10 mm. was cut out from this film in the direction of its height so that this strip comprised both the lower, strongly grafted part, and the upper part of the film, and this strip was applied to a polystyrene plate by means of a hot iron. The strongly grafted part showed good adherence to the polystyrene plate, while the upper part adhered only at a few points. A fragment of the same polytetrafluoroethylene film which, however, had not been irradiated, but was treated in the same manner, did not show any adherence to the polystyrene plate. This result itself indicated that the upper part of the Teflon film which was not dipped into the styrene had nevertheless undergone a slight grafting, possibly as a result of the styrene vapor.

In the following Examples 3 through 17, small pieces of polytetrafluoroethylene film cut out from a film of 0.1 mm. thickness by means of a punch were used. These pieces of film measured 8 x 15 mm., and were then sealed under vacuum with 3 to 5 cc. of styrene and irradiated.

Example 3

A piece of polytetrafluoroethylene film weighing 0.0278 gram was sealed under vacuum with 3 cc. of styrene and irradiated at 1220 r./hour up to a dose of 131,000 roentgens. This film considerably increased in dimensions while strictly retaining the shape of its initial contour. After drying, this grafted film weighed 0.0532 gram. It absorbed 12% of its weight of benzene at ordinary temperature.

Example 4

Another piece of film weighing 0.0320 gram was irradiated with an intensity of 1220 roentgens per hour up to a dose of 195,000 roentgens. This film when dried measured 12 x 23 mm. and weighed 0.1065 gram. It had retained in full the details of the structure of the initial film.

Example 5

Another piece of film weighing 0.0308 gram was irradiated with an intensity of 350 roentgens per hour up to a dose of 80,000 roentgens. This dried film measured 11 x 20 mm. and weighed 0.0735 gram.

Example 6

Another piece of film weighing 0.0316 gram was irradiated with an intensity of 350 roentgens per hour up to a dose of 69,000 roentgens. This film when dried weighed 0.0564 gram.

Example 7

Another piece of film weighing 0.300 gram was irradiated with an intensity of 103 r./hour up to a dose of 23,500 r. This film when dried weighed 0.0364 gram.

Example 8

Another piece of film weighing 0.0308 gram was irradiated at an intensity of 51.5 r./hour up to dose of 17,600 r. This film after drying weighed 0.0356 gram.

Example 9

Another piece of film weighing 0.0326 gram was first of all irradiated at an intensity of 51.5 r./hour up to a dose of 17,600 r. The glass tube containing this film was then irradiated at an intensity of 22,000 r./hour up to a dose of 440,000 r. This film had substantially increased in dimensions and weighed 0.0564 gram.

Example 10

Another piece of film weighing 0.0268 gram was irradiated at an intensity of 22,000 r./hours. No change in appearance of this film could be noted even after a dose of 2.5 megaroentgens. The tube was then opened and the film dried and weighed. The weight was 0.0318 gram. Its surface was not changed, but its thickness was slightly increased and the film was more rigid than the initial film.

Example 11

Another piece of film weighing 0.0244 gram was irradiated at an intensity of 7000 r./hour up to a dose of 380,000 roentgens. This film had irregular excrescences but its outer contour was practically unchanged. After drying, this film weighed 0.0380 gram.

Example 12

Another piece of film weighing 0.0274 gram was irradiated at an intensity of 2160 r./hour up to a dose of 340,000 r. After drying, this film weighed 0.0958 gram. Its surface was considerably increased without its outer contour being changed.

Example 13

Another piece of polytetrafluoroethylene film weighing 0.0304 gram was irradiated at 103 r./hour up to a dose of 46,500 roentgens. This film after drying measured 10 x 19 mm. and weighed 0.665 gram.

Example 14

Another piece of polytetrafluoroethylene film weighing 0.0254 gram was irradiated at 7000 r./hour up to a dose of 1,740,000 r. The surface of this film was very uneven and showed numerous excrescences. This film measured 9 x 16 mm. and weighed 0.0550 gram.

Example 15

Another piece of polytetrafluoroethylene film weighing 0.0254 gram was irradiated at 3560 r./hour up to a dose of 268,000 r. This film measured 12 x 22 mm. and weighed 0.0802 gram.

Example 16

Another piece of polytetrafluoroethylene film weighing 0.0252 gram was irradiated at 3560 r./hour up to a dose of 880,000 r. The surface of this film was considerably increased but the film was deformed and showed a few transparent excrescences. Its length was equal to 29 mm. and its width about 15 mm. This film weighed 0.2355 gram.

Example 17

Another piece of polytetrafluoroethylene film weighing 0.0248 gram was irradiated at 2160 r./hour up to a dose of 390,000 r. This film measured 14 x 26 mm. and weighed 0.125 gram.

Example 18

Several sheets of polytetrafluoroethylene of 0.1 mm. thickness measuring 8 x 15 mm. and weighing between 0.02 and 0.028 gram were sealed under vacuum in tubes containing styrene and subjected to irradiation of the cobalt-60 source at an intensity of 22,000 roentgens per hour. The time of irradiation varied from 39 to 967 hours. After irradiation, the sheets were washed with benzene, dried and weighed. The results are tabulated below. The increase in weight of the sheets is expressed by the ratio of the weight of the grafted sheet $Wt$. divided by the weight of the orginal sheet $Wt_0$.

Time of irradiation at
22,000 roentgens per hour             Wt./Wt.$_0$
  39 hours _____ 1.13
  73 hours _____ 1.20
  114 hours _____ 1.21
  158 hours _____ 1.24
  383 hours _____ 1.26
  967 hours _____ 1.26

These results show that continuous radiation at an intensity of 22,000 roentgens per hour does not make it possible to exceed a grafting rate corresponding to $P/P_0=1.26$ with the sheets used and under the operating conditions described above.

Example 19

A polytetrafluoroethylene sheet similar to the sheets of Example 1, weighing 0.0222 gram, was sealed under vacuum with 5 cc. of styrene and irradiated intermittently at an intensity of 22,000 roentgens per hour as indicated below.

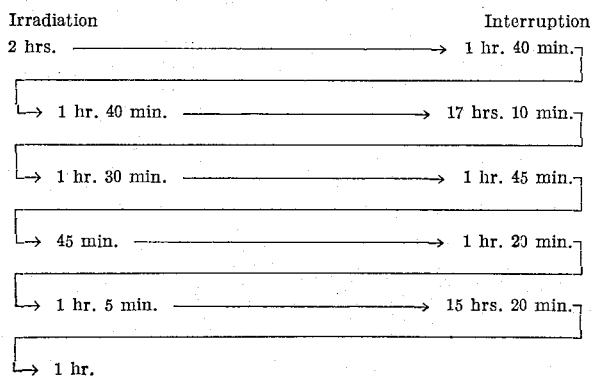

The total time of irradiation was 8 hours. The sheet, washed with benzene, after drying weighed 0.0330 grams which corresponds to $P/P_0=1.56$. The structure was entirely uniform and it measured 10 x 21 mm.

Example 20

A piece of polytetrafluoroethylene film weighing 0.0215 g. was sealed under vacuum in a mixture of 2.5 cc. of styrene and 2.5 cc. of benzene and irradiated at an intensity of 22,000 r./hour up to a dose of 1.7 megaroentgens. This film had increased in dimension and when dried measured 14 x 24 mm. and weighed 0.0470 g.

Example 21

Another piece of polytetrafluoroethylene film weighing 0.0192 g. was sealed under vacuum in a mixture of 2.5 cc. of styrene and 2.5 cc. of benzene and irradiated at an intensity of 7000 r./hour up to a dose of 510,000 roentgens.

After drying this film measured 13 x 23 mm. and weighed 0.041 g.

Example 22

A piece of a 2 mm. thick sheet of polychlorotrifluoroethylene (Kel-F) weighing 0.3968 g. was sealed under vacuum with 3 cc. of styrene and irradiated thereafter at an intensity of 1220 r./hour up to a dose of 303,000 roentgens. After drying the weight of the polymer was 0.5136 g. and it showed an irregular increase in size; the edges were highly swollen but the inner part remained unchanged.

Example 23

Another piece of polychlorotrifluoroethylene weighing 0.3818 g. was sealed under vacuum with 3 cc. of styrene and irradiated at an intensity of 350 r./hour up to the dose of 720,000 roentgens.

After this treatment the monomer had polymerized to completion and the sheet of polychlorotrifluoroethylene had noticeably increased in all dimensions. The mixture was extracted with benzene which dissolved the polystyrene and swelled the grafted sheet to a large extent. The total weight of the swollen sheet thus obtained was 7.041 g. After drying the weight was 1,221 g.

Example 24

A sheet similar to that of Example 22, weighing 0.382 gram was sealed under vacuum in a tube containing a mixture of 2 cc. of styrene and 2 cc. of benzene. This tube was then irradiated at an intensity of 1220 roentgens per hour up to a total dose of 380,000 roentgens. This sheet was swollen uniformly throughout its mass and after drying weighed 0.672 gram.

Example 25

A polytetrafluoroethylene sheet of a thickness of 0.1 mm. measuring 8 x 15 mm. and weighing 0.02217 gram was sealed under vacuum in a tube with 3 cc. of methyl methacrylate. This tube was then irradiated at an intensity of 1220 roentgens per hour up to a total dose of 400,000 roentgens. After this irradiation, there was withdrawn from the tube a compact block of polymethylmethacrylate containing the polytetrafluoroethylene sheet. The entire block was then treated with methylethylketone to dissolve the excess homopolymer. It was thus possible to withdraw the grafted sheet to which there still adhered a layer of polymethylmethacrylate. After drying, the polymethylmethacrylate in excess could be stripped from its support by folding the latter repeatedly. The sheet treated in this manner weighed 0.0231 gram. Its area had practically not increased.

Example 26

A sheet similar to the sheet of Example 25 weighing 0.0219 gram, was sealed under vacuum with a mixture of 0.2 cc. of methylmethacrylate and 2.8 cc. of benzene. This mixture was irradiated at an intensity of 1220 roentgens per hour up to a total dose of 384,000 roentgens.

After drying, this sheet weighed 0.0310 gram and measured 9 x 17 mm. It had a very uniform structure and was whiter and harder than the initial sheet.

Example 27

A polytetrafluoroethylene sheet similar to the sheet of Example 25, weighing 0.0228 gram, was sealed under vacuum with 5 cc. of styrene and irradiated at an intensity of 22,000 roentgens per hour up to a total dose of 8,400,000 roentgens.

After washing in benzene and drying, this sheet weighed 0.0287 gram. It was harder and thicker than the initial sheet, but its other dimensions were unchanged.

Example 28

A sheet similar to that of Example 25, weighing 0.0215 gram, was sealed under vacuum with a mixture of 2.5 cc. of styrene and 2.5 cc. of benzene. This sheet was irradiated at an intensity of 22,000 roentgens per hour up to a dose of 3,120,000 roentgens.

After irradiation, the film had increased considerably in volume. After washing in benzene and drying, it weighed 0.0470 gram and measured 14 x 24 mm.

Example 29

A polytetrafluoroethylene sheet similar to the sheet of Example 25, weighing 0.0226 gram, was sealed under vacuum with a mixture of 2.5 cc. of styrene and 2.5 cc. of benzene. This sheet was then irradiated at an intensity of 7000 roentgens per hour up to a total dose of 1,600,000 roentgens. This sheet increased considerably in size; it weighed 0.0790 gram and measured 15 x 29 mm.; it had an entirely uniform structure.

We claim:
1. In the process for producing graft copolymers, in which styrene is grafted on a polyperhalogenated olefin selected from the group consisting of polytetrafluoroeth- ylene and polychlorotrifluoroethylene polymer, in which said polymer is subjected to high energy ionizing radiation in the presence of styrene, the improvement which comprises effecting the radiation at a low intensity, producing a polymerization rate below the rate of penetration of the monomer through the graft copolymer formed, while the monomer is present in a solvent.

2. Improvement according to claim 1, in which said polymer is polytetrafluoroethylene and said solvent is benzene.

3. In the process for producing graft copolymers, in which styrene is grafted on polychlorotrifluoroethylene polymer, in which said polymer is subjected to high energy ionizing radiation in the presence of styrene, the improvement which comprises effecting the radiation at a low intensity, producing a polymerization rate below the rate of penetration of the monomer through the graft copolymer formed, while the monomer is present in a solvent.

4. Improvement according to claim 3, in which said solvent is benzene.

5. In the process for producing graft copolymers of styrene and polytetrafluoroethylene, in which polytetrafluoroethylene is subjected to high energy ionizing radiation in the presence of styrene monomer, the improvement for effecting the grafting which comprises effecting the radiation at a low intensity, producing a polymerization rate below the rate of penetration of the monomer through the graft copolymer formed, said radiation being effected with an intensity below about 7,000 roentgen units per hour.

6. Improvement according to claim 5, in which said irradiation is effected with an intensity below about 3500 roentgen units per hour.

7. Improvement according to claim 6, which includes increasing the intensity of said radiation to a value producing a polymerization rate above the rate of monomer penetration, after said monomer has penetrated to the desired depth.

8. Improvement according to claim 7, which includes increasing the intensity of said radiation after said monomer has penetrated throughout said polymer.

9. Improvement according to claim 8, in which said increase in radiation is effected by moving said polymer and the source of radiation closer together during the radiation.

10. In the process for producing graft copolymers, in which a polymer is subjected to high energy ionizing radiation in the presence of a monomer, the improvement for effecting the grafting an polyperhalogenated olefin in which at least a portion of the halogen substituents are fluoro which comprises effecting the radiation at a low intensity, producing a polymerization rate below the rate of penetration of the monomer through the graft copolymer formed, while the monomer is present in a solvent.

11. Improvement according to claim 10, in which said polymer is polytetrafluoroethylene, and said monomer is methylmethacrylate present in benzene.

12. Improvement according to claim 10, in which said solvent is a solvent decreasing the polymerization rate of said monomer.

13. Improvement according to claim 12, in which said solvent is an aromatic hydrocarbon.

14. Improvement according to claim 13, in which said solvent is benzene.

15. Improvement according to claim 10, in which said monomer is present in a solvent capable of increasing the diffusion rate thereof through the graft copolymer formed.

16. In the process for producing graft copolymers, in which the polymer is subjected to high energy ionizing radiation in the presence of a monomer, the improvement for effecting the grafting on a polyperhalogenated olefin in which at least a portion of the halogen substituents are fluoro which comprises effecting the radiation at an intensity producing a polymerization rate above the rate of penetration of the monomer through the graft copolymer formed, and periodically reducing the radiation intensity to a value and for a period of time sufficient to allow penetration of the monomer through the graft copolymer formed.

17. Improvement according to claim 16, in which the radiation is periodically interrupted.

18. In the process for producing graft copolymers, in which styrene is grafted on a polyperhalogenated olefin selected from the group consisting of polytetrafluoroethylene and polychlorotrifluoroethylene polymer, in which said polymer is subjected to high energy ionizing radiation in the presence of styrene, the improvement which comprises effecting the radiation at a low intensity, producing a polymerization rate below the rate of penetration of the monomer through the graft copolymer formed, said radiation being effected with an intensity below about 7,000 roentgen units per hour.

19. In the process for producing graft copolymers in which a polymer is subjected to high energy ionizing radiation in the presence of a monomer, the improvement for effecting the grafting on a polyperhalogenated olefin in which at least a portion of the halogen substituents are fluoro which comprises periodically interrupting the radiation for a period of time sufficient to allow penetration of the monomer through the graft copolymer formed.

20. Improvement according to claim 19 which includes raising the temperature of the monomer and polymer during said radiation interruptions.

21. In the process for producing graft copolymers in which a polymer is subjected to high energy ionizing radiation in the presence of a monomer, the improvement for effecting the grafting on a polyperhalogenated olefin in which at least a portion of the halogen substituents are fluoro, which comprises periodically reducing the radiation intensity to a value and for a period of time sufficient to allow penetration of the monomer through the graft copolymer.

References Cited by the Examiner

UNITED STATES PATENTS 2,837,496   6/1958   Vandenburg _____ 260—2.1

FOREIGN PATENTS 801,258   9/1958   Great Britain.

OTHER REFERENCES

Brookhaven National Laboratory (BNL 375), page 26, April 1956, Quarterly Progress Report, Oct. 1–Dec. 31, 1955.

Brookhaven National Laboratory, Upton, N.J., "Progress Reports on Fission Products Utilization," IX, October 1956, pages 1–14.

Chapiro, J. Chem. Phys., vol. 52, pages 246–252 (March 1955).

Chen, J. Poly. Sci., vol. 23, pages 903–913 (February 1957).

Harwood et al., "The Effects of Radiation on Materials," Reinhold, April 23, 1958, pages 269 and 287–303.

Metz, Nucleonics, 16, 73–77, April 1958.

WILLIAM H. SHORT, *Primary Examiner.*

HAROLD BURSTEIN, *Examiner.*

LOUISE P. QUAST, JOSEPH LIBERMAN, J. C. MARTIN, *Assistant Examiners.*